(12) United States Patent
Heinrich et al.

(10) Patent No.: US 9,195,067 B1
(45) Date of Patent: Nov. 24, 2015

(54) WEARABLE DEVICE WITH INPUT AND OUTPUT STRUCTURES

(71) Applicant: Google Inc., Mountain View, CA (US)

(72) Inventors: Mitchell Joseph Heinrich, San Francisco, CA (US); Maj Isabelle Olsson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 318 days.

(21) Appl. No.: 13/630,481

(22) Filed: Sep. 28, 2012

(51) Int. Cl.
*G02B 27/01* (2006.01)
*H04N 13/02* (2006.01)
*G06F 3/03* (2006.01)

(52) U.S. Cl.
CPC ........ *G02B 27/0172* (2013.01); *G02B 27/0176* (2013.01); *G06F 3/0304* (2013.01); *H04N 13/0285* (2013.01); *G02B 2027/014* (2013.01); *G02B 2027/0154* (2013.01); *G02B 2027/0178* (2013.01); *G02B 2027/0198* (2013.01)

(58) Field of Classification Search
CPC .... G02B 27/01; G02B 27/02; G02B 27/0172; G02B 2027/0178; G02B 27/0176; G02B 2027/0198; G02B 27/0154; G02B 2027/01; G02B 2027/014; H04N 13/0285; G06F 3/0304
USPC .......................... 345/7, 8; 348/53, 115; 359/13
See application file for complete search history.

(56) References Cited

U.S. PATENT DOCUMENTS

| | | | | |
|---|---|---|---|---|
| 4,666,417 A | * | 5/1987 | Hillman | 446/267 |
| 6,034,653 A | * | 3/2000 | Robertson et al. | 345/8 |
| 6,057,966 A | * | 5/2000 | Carroll et al. | 359/630 |
| 6,181,304 B1 | * | 1/2001 | Robinson et al. | 345/8 |
| 6,234,446 B1 | * | 5/2001 | Patterson | 248/694 |
| 6,747,611 B1 | * | 6/2004 | Budd et al. | 345/7 |
| 7,158,096 B1 | | 1/2007 | Spitzer | |
| 7,192,069 B1 | * | 3/2007 | Daniel | 294/147 |
| 7,663,805 B2 | | 2/2010 | Zaloum et al. | |
| 7,843,403 B2 | | 11/2010 | Spitzer | |
| 8,000,000 B2 | | 8/2011 | Greenberg et al. | |
| D660,341 S | * | 5/2012 | Olsson et al. | D16/300 |
| 8,616,422 B2 | * | 12/2013 | Adelman et al. | 224/191 |
| 2002/0118535 A1 | * | 8/2002 | Nostrant | 362/124 |
| 2005/0219152 A1 | * | 10/2005 | Budd et al. | 345/8 |

(Continued)

FOREIGN PATENT DOCUMENTS

WO 2010092904 A1 8/2010

OTHER PUBLICATIONS

International Search Report & Written Opinion for Application No. PCT/US2012/050690 dated Feb. 28, 2013.

*Primary Examiner* — Michael J Eurice
(74) *Attorney, Agent, or Firm* — Lerner, David, Littenberg, Krumholz & Mentlik, LLP

(57) ABSTRACT

An electronic device includes a display and a band configured to be worn on the head of a user. The band defines a display end to which the display is affixed and extends from the display end to a free end. The band is adjustable such that it can be configured by a user to contact the head of the user at a first location near a temple, a second location along a portion of the user's ear adjacent the temple, and at a third location along a rear portion of the head of the user. The display end is positionable away from the head such that the display element is suspended over an eye adjacent the temple. The band is further configured to maintain the configuration. The device also includes image generating means within the band for generating an image presentable to the user on the display.

10 Claims, 13 Drawing Sheets

(56) References Cited

U.S. PATENT DOCUMENTS

| | | | |
|---|---|---|---|
| 2005/0225867 A1* | 10/2005 | Ishibashi et al. | 359/630 |
| 2005/0274425 A1* | 12/2005 | Ostrander et al. | 138/144 |
| 2006/0119539 A1* | 6/2006 | Kato et al. | 345/8 |
| 2006/0132382 A1* | 6/2006 | Jannard | 345/8 |
| 2007/0103388 A1* | 5/2007 | Spitzer | 345/8 |
| 2007/0200208 A1* | 8/2007 | Wang | 257/668 |
| 2007/0248238 A1* | 10/2007 | Abreu | 381/381 |
| 2008/0138774 A1* | 6/2008 | Ahn et al. | 434/114 |
| 2009/0095854 A1* | 4/2009 | Forbes et al. | 248/176.3 |
| 2009/0201460 A1 | 8/2009 | Blum et al. | |
| 2010/0073262 A1* | 3/2010 | Matsumoto | 345/8 |
| 2010/0110368 A1* | 5/2010 | Chaum | 351/158 |
| 2010/0149073 A1 | 6/2010 | Chaum et al. | |
| 2010/0149093 A1* | 6/2010 | Edwards | 345/156 |
| 2010/0157433 A1 | 6/2010 | Mukawa et al. | |
| 2010/0245585 A1* | 9/2010 | Fisher et al. | 348/164 |
| 2011/0286217 A1* | 11/2011 | Martinson et al. | 362/253 |

* cited by examiner

WEARABLE DEVICE WITH INPUT AND OUTPUT STRUCTURES

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms. Accordingly, further advances in wearable devices including displays have been needed.

BRIEF SUMMARY

An aspect of the present disclosure relates to an electronic device. The device includes a display and a band configured to be worn on the head of a user. The band defines a display end to which the display is affixed and extends from the display end to a free end. The band is adjustable along at least a portion thereof such that the band can be configured by a user to contact the head of the user at a first location near a temple of the user's head, a second location along a portion of the user's ear adjacent the temple, and at a third location along a rear portion of the head of the user. The display end is positionable away from the head of the user such that the display element is suspended over an eye of the user adjacent the temple. The band is further configured to maintain the configuration by the user. The device also includes image generating means disposed within the band and configured for generating an image presentable to the user on the display.

The device can further include an input device positioned along a portion of the band. In an example, the input device can be configured for receiving, from the user, an input associated with a function, the function being related to information that is presentable on the display. In a further example, the band can define an outside surface, a portion of which includes a touch-sensitive surface that comprises the input device. The band can define an interior cavity having an interior surface, and circuitry related to the touch-sensitive surface can be disposed within the cavity adjacent to the interior surface. The circuitry can include touch-based input circuitry that is flexible in at least one direction.

The band can be adjustable to change from a first shape of the band to a second shape that corresponds to the head of the user. The first shape can include at least one bend, and the change from the first shape can include one of compressing the bend and extending the bend. In another example, the band can include a scoop portion adjacent the free end thereof. The scoop portion can be curved at a first degree, and the change from the first shape can include one of increasing and decreasing a degree of curvature of the scoop portion. In another example, the first shape can define a length of the device, and the change from the first shape can include one of extending or shortening the length.

The band can be rigid near the display end thereof to define an elbow portion between the display end and the body of the band, and the elbow portion can be curved between the display and an adjacent portion of the band. The image generating means can be disposed within the elbow portion. Further, the display can define a viewing surface, and the band can further include a camera affixed within the elbow portion and directed outward from the elbow portion in a direction perpendicular to the viewing surface of the display element.

The band can include a rigid end portion that can be shaped to generally contour to the back of a user's head. In such an example, the device can further include an electronic element electrically connected with the image generating means, the rigid end portion can define an interior cavity, and the electronic element is enclosed in the interior cavity. The electronic element can be electrically connected with the image generating means through circuitry that is enclosed in the band. Further, the electronic element can include electronic circuitry configured to perform a function associated with the device. Additionally or alternatively, the electronic element can include conductive connections configured for connecting with a battery, and the conductive connections can be further configured to provide power from the battery to the image generating means.

Another aspect of the present disclosure relates to an electronic device. The device includes a display and a band configured to be worn on the head of a user. The band defines a display end to which the display is affixed and extends from the display end to a free end. The band includes an inner member and an outer member. The outer member has a general shape that defines a temple portion adjacent the display end, a scoop portion adjacent the free end, and an ear portion between the temple portion and the scoop portion. The general shape is deformable within a range such that the user can configure the band in an adjusted shape such that the scoop portion contacts a rear portion of the head of the user, the ear portion contacts a portion of an ear of the user, and the temple portion contacts a portion of a temple of the user adjacent the ear, and such that the display element is suspended over an eye of the user adjacent the temple. The inner member permits deformation and facilitates retention of the outer member in the adjusted shape. Image generating means are disposed within the band and are configured for generating an image presentable to the user on the display.

The outer member can include an outside surface, and the band can further include touch-based input circuitry disposed therein such that a portion of the outside surface acts as a touch-based input configured for receiving, from the user, an input associated with a function. Such a function can be related to information that is presentable on the display.

In an example, at least a portion of the inner member can be elastically deformable below a first stress limit and plastically deformable above the first stress limit, and the outer member can be elastically deformable below a second stress limit that is greater than the first stress limit. The first stress limit can allows the inner member to elastically deform when being worn by the user in the adjusted configuration. The first stress limit can allow the inner member to be elastically deformed during removal of the device from the head of the user. In an example, the outer member can comprise a molded thermoplastic elastomer. Further, at least a portion of the inner member can include armature wire.

In another example, the inner member can include a volume of magnetorheological fluid that can be configured such that the inner member retains the outer member in the adjusted shape in the presence of a magnetic field above a retention threshold and permits adjustment to the general shape of the outer member in the presence of a magnetic field below the retention threshold.

Additionally or alternatively, the inner member can include a plurality of rigid sections on opposing ends of at least one malleable section such that the inner member permits adjustment to the general shape of the outer member in at least one adjustment area adjacent the malleable section, while limiting such adjustment in areas adjacent the rigid sections. The inner member can include a stiffening member disposed on the at least one malleable section. The device can further including one or more electronic components, and at least one of the rigid sections can include a housing in which at least one of the one or more electronic components is retained.

Another aspect of the present disclosure relates to an electronic device, including a display and a band configured to be worn on the head of a user. The band defines a display end to which the display element is affixed and extends from the display end to a free end. The band has a shape thereof that is configured to contact the head of the user at a first location near a temple of the user's head, a second location along a portion of the user's ear adjacent the temple, and at a third location along a rear portion of the head of the user. The display end is positionable away from the head of the user such that the display element is suspended over an eye of the user adjacent the temple. The band is pliable along at least a portion thereof such that the shape of the band can be adjusted by a user based on the size and shape of the user's head. Image generating means are disposed within the band and are configured for generating an image presentable to the user on the display. The device further includes input means affixed to the band and configured for receiving from the user an input associated with a function, the function being related to information that is presentable on the display.

DETAILED DESCRIPTION

Figure 1:
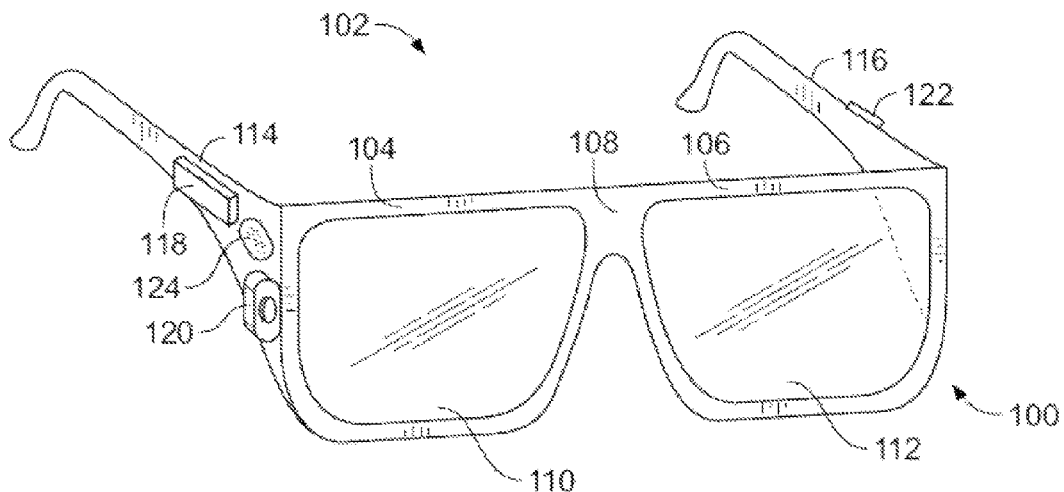
FIG. 1 shows an exemplary system for receiving, transmitting, and displaying data.

Embodiments of the present disclosure are described herein with reference to the drawing figures. FIG. 1 illustrates an example system 100 for receiving, transmitting, and displaying data. The system 100 is shown in the form of a wearable computing device. While FIG. 1 illustrates a head-mounted device 102 as an example of a wearable computing device, other types of wearable computing devices could additionally or alternatively be used. As illustrated in FIG. 1, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened 20 surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
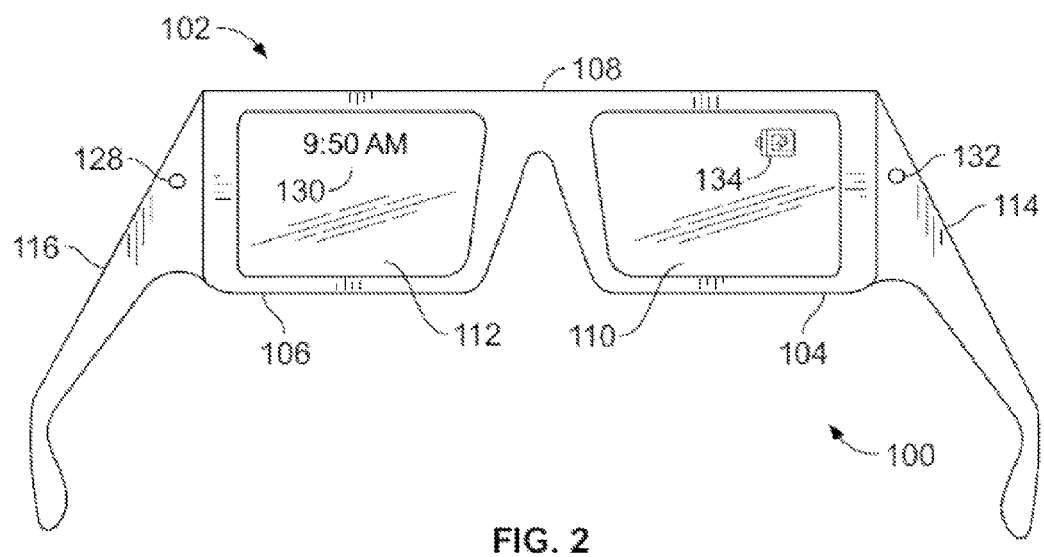
FIG. 2 shows an alternate view of the system of FIG. 1.

FIG. 2 illustrates an alternate view of the system 100 illustrated in FIG. 1. As shown in FIG. 2, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
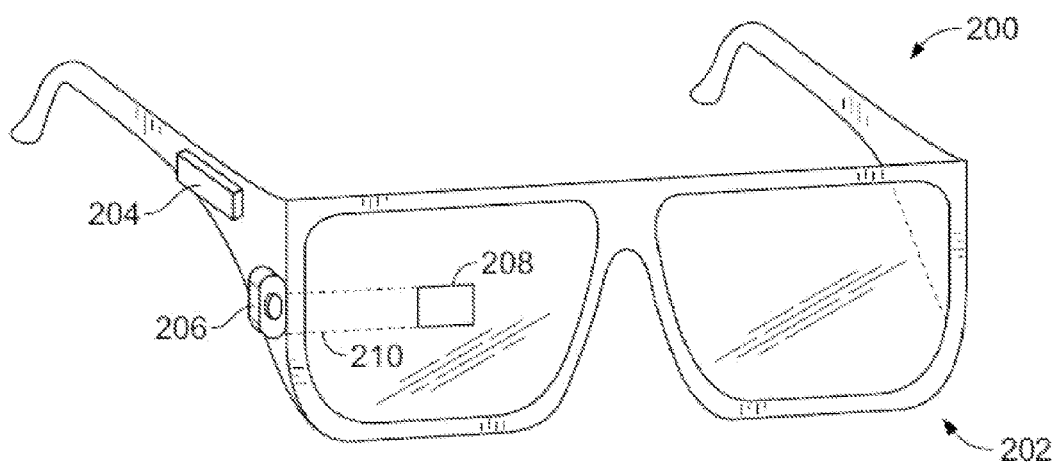
FIG. 3A shows an example system for receiving, transmitting, and displaying data.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2. The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 3B:
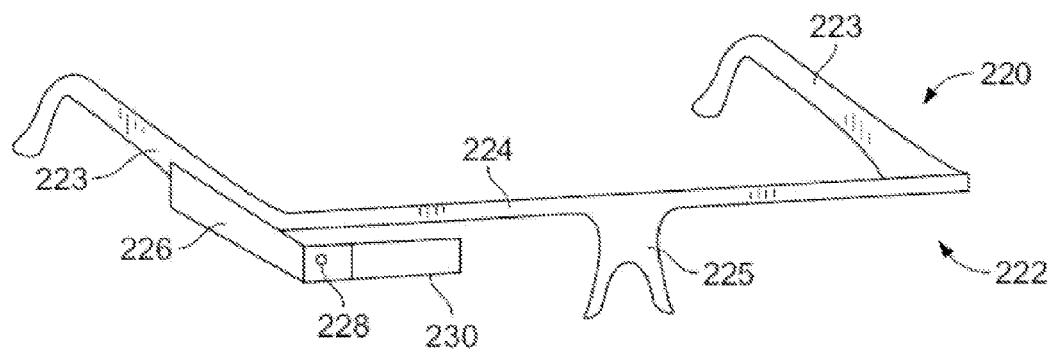
FIG. 3B shows an example system for receiving, transmitting, and displaying data.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an onboard computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Figure 4:
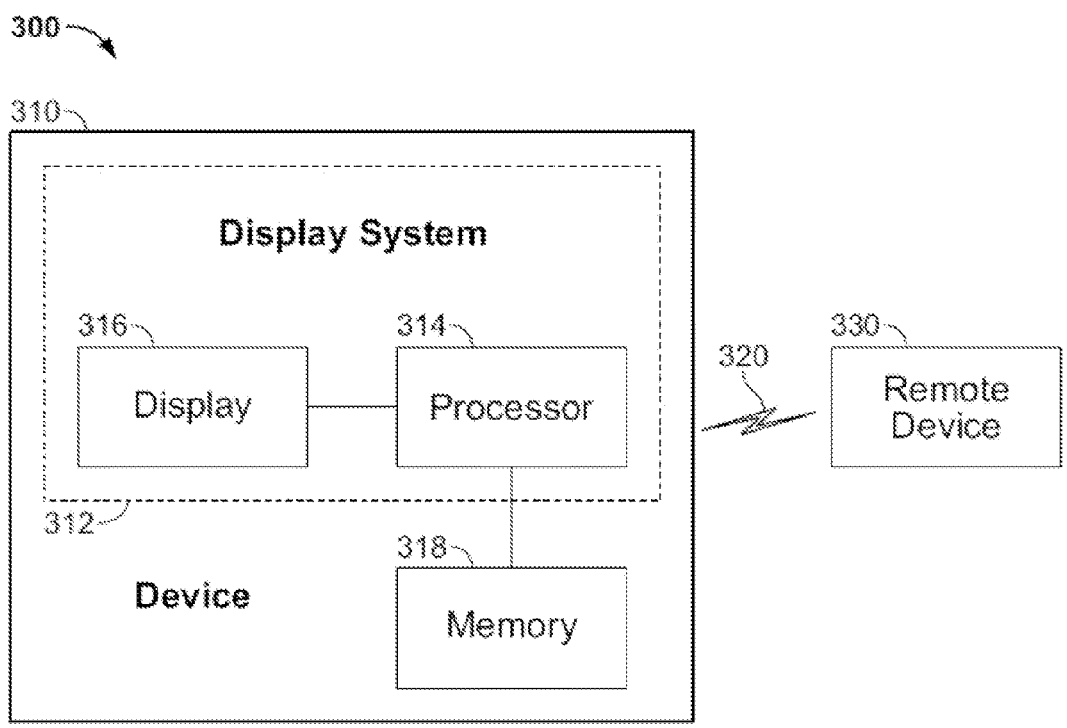
FIG. 4 shows an example system for receiving, transmitting, and displaying data.

FIG. 4 illustrates a schematic drawing of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, 10 the device 310 may be a heads-up display system, such as the head-mounted device 102, 200, or 220 described with reference to FIGS. 1-3B.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 4, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 5:
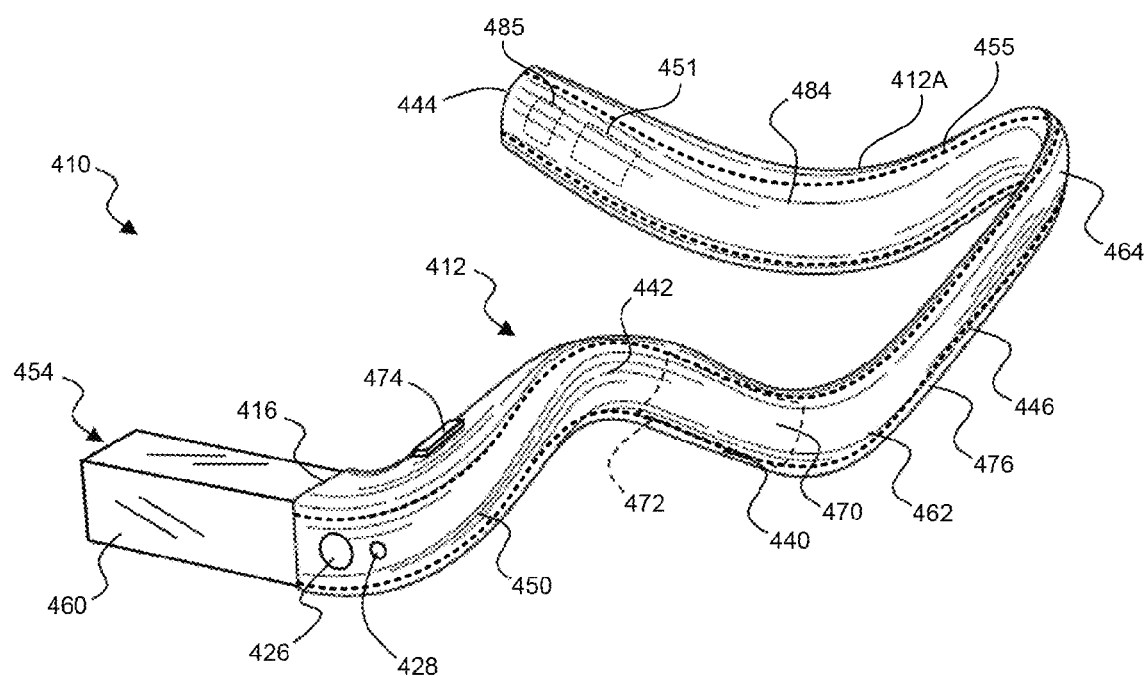
FIG. 5 shows a wearable computer device according to an embodiment of the present disclosure.
Figure 6:
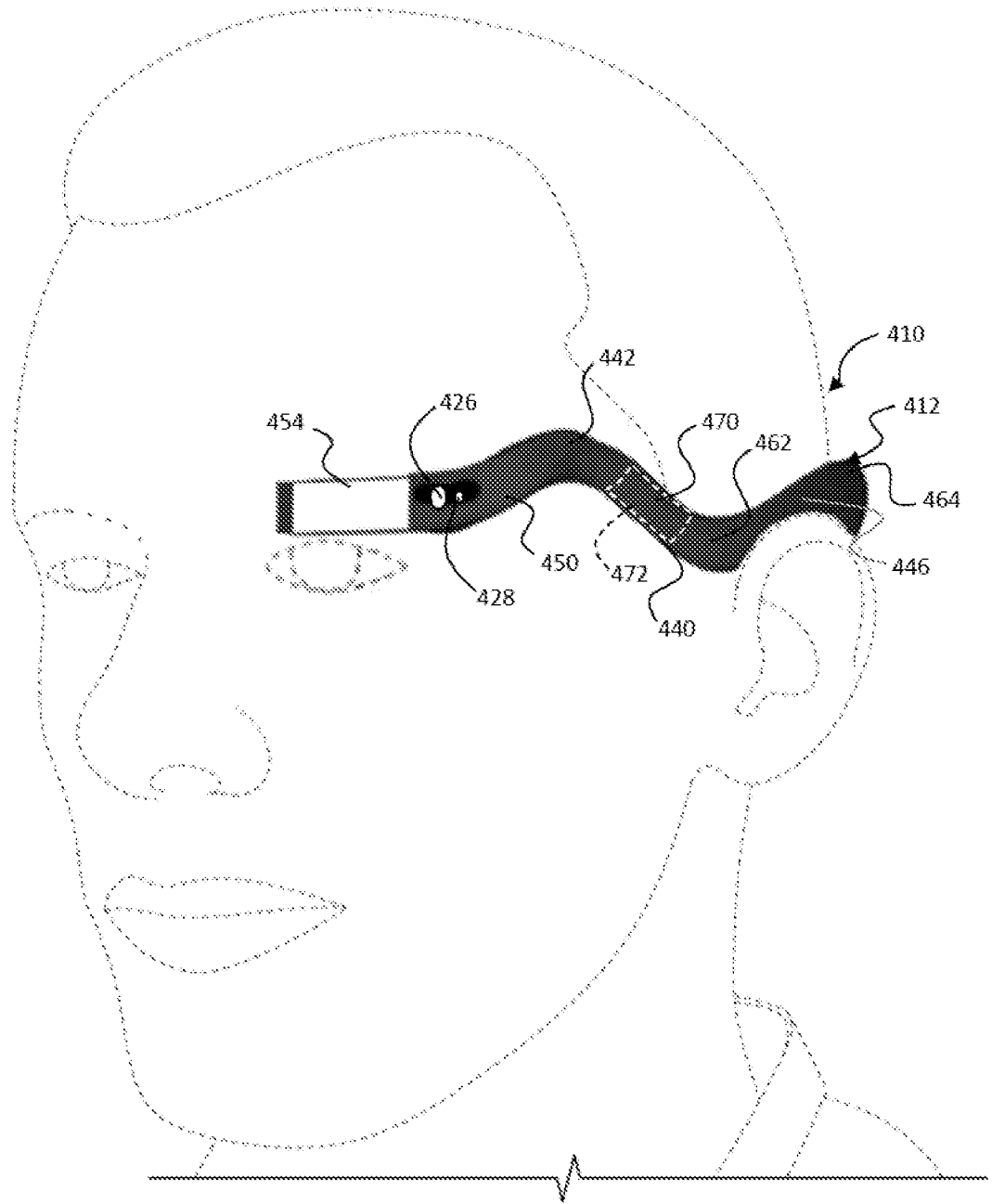
FIGS. 6 and 7 show the assembly of FIG. 5 being worn on the head of a user.

FIGS. 5-15, which do not adhere to the same numbering scheme used in FIGS. 1-4, illustrate an embodiment of a wearable device 410 that can implement the various systems discussed above with reference to FIGS. 1-4. FIG. 5 shows an embodiment of a device 410 that is wearable on the head of the user (as shown in FIG. 6). As will be described in greater detail below, device 410 includes a band 412 that provides the desired fit of device 410 on a user's head. Band 412 has a first end 416 on which a display element 454 is mounted. Band 412 is configured such that when device 410 is properly worn by a user, display 454 can be positioned adjacent the user's eye for making an image presented thereon viewable by the user. In this manner, device 410 can carry out at least one operation, namely presenting an image to the user. Additional operations can also be carried out by device 410, including receiving an input from a user via a touch-based input 470 that is accessible to the user and is configured to receive a touch input from the user to execute a control function of the device 410 or a function of another electronic device that is connected or in communication with device 410.

Touch-based input 470, or another type of input, can be used to provide a control function that is executed by device 410, such as by an on-board CPU or a CPU mounted to or within an associated wearable structure, or by a remote device, such as a smartphone or a laptop computer. In an example, information related to the control function is viewable by the user on display 454. In one example, the control function is the selection of a menu item. In such an example, a menu with a list of options can be presented on display 454. The user can move a cursor or can scroll through highlighted options by predetermined movement of a finger along touch-based input 470 and can confirm the selection by a different movement, the acceptance of the selection being indicated by the display. Examples of menu item selections can include whether to answer or decline an incoming call on a remotely-linked smartphone or to scroll or zoom-in on a map presented in display.

Additional input structures can be included in band 412. These can include a camera 426 and a sensor 428, as shown in FIG. 5. The camera 426 can be used to capture an image or video at the user's discretion. The camera 426 can also be used by the device to obtain an image of the user's view of his or her environment to use in implementing augmented reality functionality. The sensor 428 can be, for example a light sensor that can be used by firmware or software associated with the camera 426. As shown in FIG. 5, the camera and sensor can be included within the elbow portion 450 of band 412 and facing in a direction substantially perpendicular to viewing surface 460 of display 454. In such an arrangement, camera 426 is positioned to face in a direction along the user's line of sight, and sensor 428 is positioned to sense light within the view of the camera 426. Other locations for the camera 426 and sensor 428 are also possible.

Device 410 can include additional input structures, such as a button 474 that can provide additional functionality for device 410, including implementing a lock or sleep mode or allowing a user to toggle the power for device 410 between on and off states. Button 474 can additionally or alternatively be configured to cause device 410 to capture a still image using camera 426. Such an image can be stored in the device's memory as an image file and/or can be electronically sent to another device.

In the example shown, band 412 includes an elbow portion 450 that supports display 454 at an angle relative to the adjacent portions of band 412. As shown in the figures, display 454, which is also elongated and generally defines a display axis, can extend relative to, for example, temple portion 440 at an angle that can range from about 80° to about 110°. In an embodiment, display 454 is angled with respect to temple portion 440 by between about 80° and 110°, for example by approximately 90°. Elbow portion 450 can be curved, as shown in the figures, or can include a sharp corner or can be configured such that display 454 projects directly outwardly therefrom. In an embodiment, the image source associated with display 454 and its related circuitry can be held within band 412 in elbow portion 450. Touch-based input 470 can be positioned within temple portion 440 such that, when display 454 is positioned over a user's eye, temple portion 440 is positioned in a position that extends over the user's temple adjacent that eye.

Figure 11:
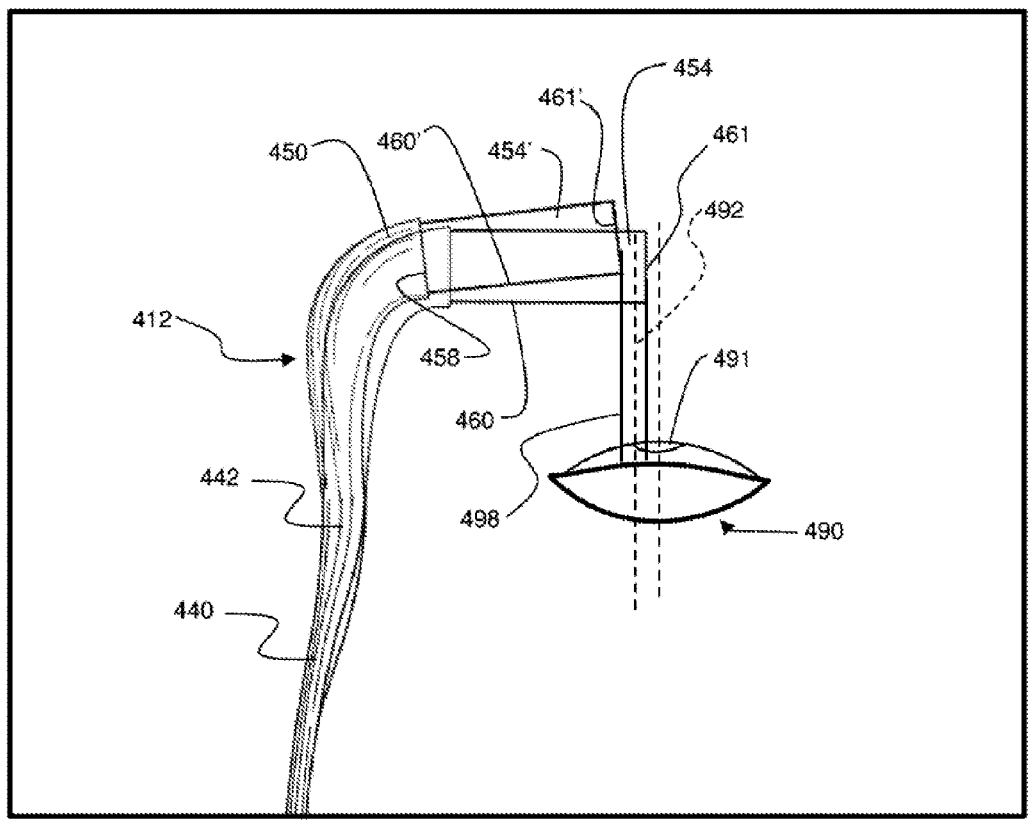
FIG. 11 shows the device of FIG. 5 in additional adjustment configurations thereof.

In the example shown, display 454 is in the form of a generally-transparent prism that is configured to overlay or combine with the user's sight an image generated by electronic display components that are positioned within band 412. Such a prism can be structured to receive a projected image in a receiving side 458 (FIG. 11) and to make that image visible to a user by looking into a viewing side 460 of display 454. This can be done by configuring display 454 with a specific shape and or material characteristics. In the example of FIG. 5 the receiving side 458 of display 454 (as shown in FIG. 11) is adjacent to or within band 412 such that the electronic components inside band 412 can contain a video projector structured to project the desired video image into receiving side 458 of prism 454. Such projectors can include an image source such as LCD, CRT, and OLED displays and a lens, if needed, for focusing the image on an appropriate area of display 454. The electronic components associated with display 454 can also include control circuitry for causing the image source to generate the desired image based on a video signal received thereby. Other types of displays and image sources are discussed herein and can also be incorporated into band 412.

The receiving surface 458 of display 454 can be perpendicular to the viewing surface 460 such that a transparent prism can be used as display 454 to combine the projected image with the view of the environment surrounding the wearer of the device. This allows the user to observe both the surrounding environment and the image projected into display 454. The display 454 and the display electronics can be configured to present an opaque or semi-transparent image, or combinations thereof, to achieve various desired image combinations. Further, an alternative display can be in the form of a video screen consisting of, for example, a transparent substrate. In such an example, the image generating means can be circuitry for a LCD display, a CRT display or the like positioned directly behind the screen such that the overall display is not transparent. The band 412 can extend behind the display and the image generating means to enclose the image generating means in such an embodiment.

Band 412 is shown in FIG. 5 as having a unitary configuration that is configured to fit on the head of a user. As such band 412 can have reconfigurable structure including a number of regions, each with a general shaped that is at least partially adjustable itself or in its position relative to the other regions. In the example shown, band 412 can be considered as having an elbow portion 450 that extends from first end 416. Elbow portion 450 can be configured to appropriately orient display 454 with respect to the remainder of band 412 such as by including a bend of between about 80° and 110° as elbow portion 450 extends away from first end 416 and continues away from display 454. Elbow portion 450 can also extend upward relative to display 454. That is, elbow portion 450 can be angled upward relative to display in a position wherein device 410 is being worn on a user's head with display 450 positioned at least partially within the user's line of sight.

Temple portion 440 can be adjacent elbow portion 450 along band 412 and can be separated therefrom by a first bend 442 that can be configured such that temple portion 440 extends downward relative to elbow portion 450. Temple portion 440 can be approximately the same length as elbow portion 450 or somewhat longer or shorter. Temple portion 440 can then transition to a second bend 462 that movably attaches temple portion 440 to a side portion 446 that further extends therefrom within the shape of band 412. Side portion 446 can again extend upward from second bend 462 relative to temple portion 440 and can extend at a length greater than temple portion 440 such as approximately the length of temple portion 440 and elbow portion 450 combined.

Side portion 446 can also curve inward relative to temple portion 440, such as in the direction of the longitudinal axis of display 454. This inward bend can continue smoothly as side portion 446 transitions into an end portion or scoop portion 484 of band 412. Scoop portion 484 can extend generally in a direction parallel with display 454, but can also include a curvature thereof that continues from the curve of side portion 446. In such a manner, the second end 444 of band, which can be defined on scoop 484 can be oriented in a direction having a component toward the front of the user's head. A third bend 464 can be positioned between side portion 446 and scoop portion 484 such that scoop portion, at least initially, is directed downward relative to side portion 446. Scoop portion 484 can be curved in a vertical direction, in addition to the inward curvature already described, such that scoop portion 484 is directed upward at second end 444, as shown in FIG. 7.

Band 412 can have a generally thin profile and include an interior cavity 455 for housing various components discussed herein. Band 412 includes a width (in a direction along the side of the user's head, for example) of less than about 0.6 inches or less through most of its length. The thickness of band 412 (in a direction outwardly away from a user's head, for example) can be about 0.25 inches or less. Band 412 may have a non-uniform profile, wherein some areas are wider or thicker than others. In particular, scoop portion 484 can be wider than other portions of band 412 to increase the contact area between band 412 and a user's head in the area thereof. Further, other areas may be thicker to accommodate internal components of device 410 that will be discussed in greater detail below. Still further, some areas may be relatively thinner to permit bending thereof during reconfiguration of the shape of band 412.

Figure 7:
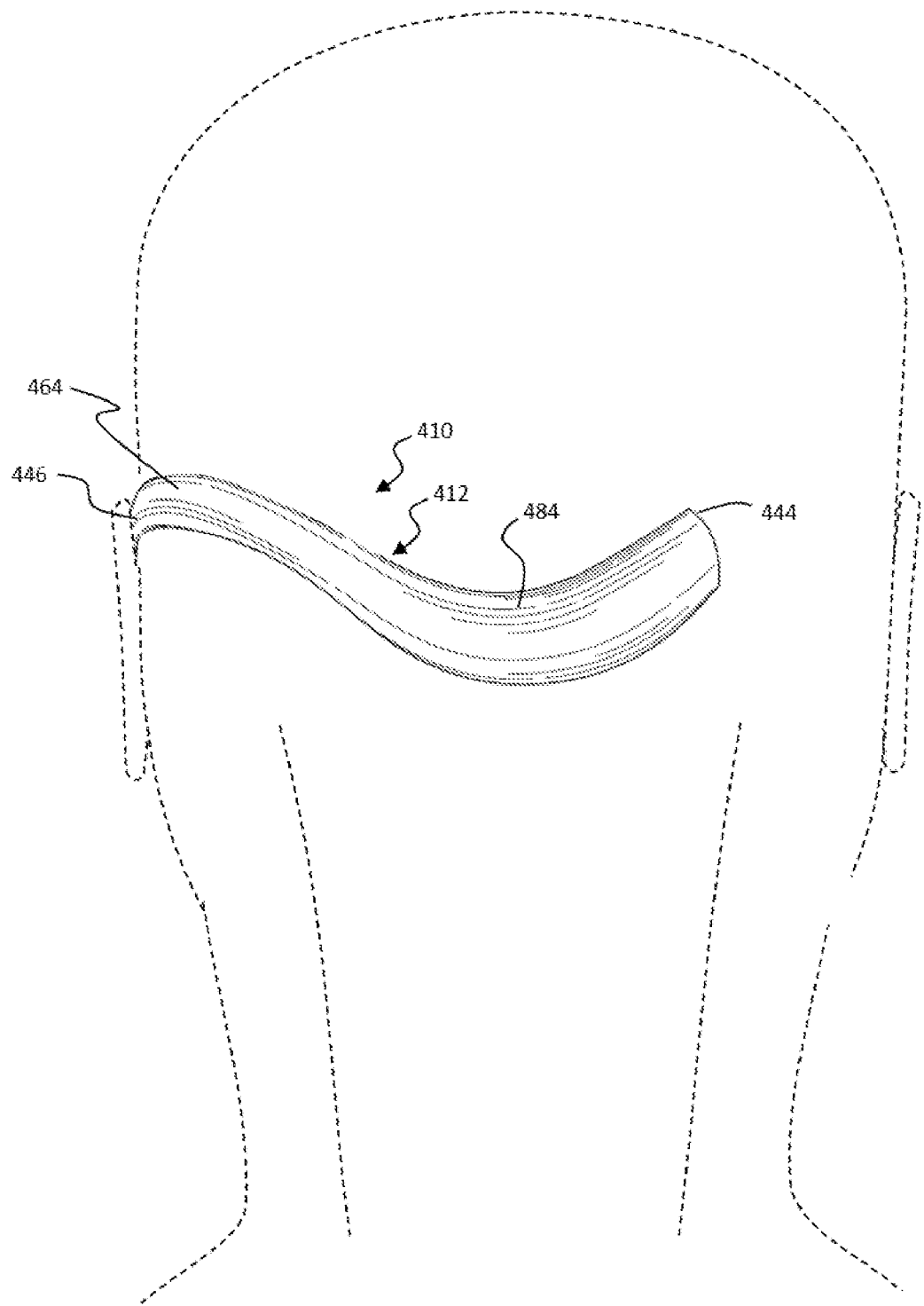

As shown in FIGS. 6 and 7, the above-described shape of band 412 can facilitate the wearing thereof on a user's head. In particular, the shape of side portion 446 and scoop portion 484 can help to retain device 410 on the user's head, while the pattern of upwardly-directed portions and downwardly-directed portions can provide balancing forces to help maintain a position of display 454 such that display 454 is suspended over one of the user's eyes. As shown in FIG. 7, scoop portion 484 is configured to cradle a portion of the back of the user's head. For example, band 412 can be configured such that scoop portion 484 is positionable on the back of the user's head just above where the back of the neck meets the back of the head. This portion of the head is generally angled inward such that scoop can be positioned slightly beneath this portion of the head. As shown in FIG. 6, side portion 446 is configured to be positionable such that a portion thereof can rest on top of the user's ear on the side of the user's head adjacent the display 454. Such a portion may be completely within side portion 446 or within a transition area between side portion 446 and second bend 462. As shown, this portion can be angled downward such that side portion 446 can exert a force on the ear that at least has a component in a direction toward the back of the user's head.

In such a manner, scoop portion 484 and side portion 446 can exert forces on the user's head that have opposing components. Scoop portion 484 can exert a forward force on the back of the user's head, while side portion 484 can exert a rearward force on part of the user's ear. These forces can help to retain device 410 on the user's head. Additionally, the shape of scoop portion 484, wherein end 444 extends forward of other areas of scoop portion 484 can provide a retention force with at least a component in a lateral direction that opposes a force against the side of the user's head by, for example, side portion 446 and temple portion 440.

Scoop portion 484 can also be configured to provide a balancing force against the weight of elbow portion 450 and display 454 with the point of contact between side portion 446 and the user's ear acting as a fulcrum. This balancing force can help to comfortably maintain the display 454 in a position suspended within the user's field of view, as depicted in FIG. 6. The balancing of elbow portion 450 and display 454 with scoop portion 484 can be configured based on the locations of various internal components of device 410 (as discussed below) and the weights thereof. In one example, elbow portion 450 can include electronic circuitry for generating a user-viewable image within display 450. In such an example, scoop portion 484 can include the interior cavity 455 containing one or more batteries 485 for providing portable power for device 410 and/or other electronic components or circuitry 451 relating to the functions of device 410. These batteries and other components can be positioned at various strategic locations within scoop portion 484 to provide the desired balancing.

Scoop portion 484 can be configured to include a battery or multiple batteries of various forms, such as AAA, AA, or 9-volt style batteries. The battery can also be a rechargeable battery such as a lithium-ion or nickel-cadmium battery and can be removable by the user or can be permanent or semi-permanent. Scoop portion 484 can also include a port (not shown) that can be used to connect device 410 to a power source to recharge any internal batteries without removal thereof or to connect device 410 to a remote device for communication therewith, such as described above, or to update or install software or firmware included in the memory of device 410.

The desired fit of device 410 on the head of a user can be further added to by the above-discussed relative orientations of temple portion 440 and side portion 446. As discussed above, temple portion 440 can be directed downward in the direction between elbow portion 450 and side portion 446. Further, side portion 446 can be angled upward as it extends away from temple portion 440 and can arc back downward as it extends over the user's ear. By positioning these features so that they traverse the side of the user's head in an upward-and-downward fashion, including above the point of contact between side portion 446 and the user's ear, band 412 can create opposing forces that act against tipping or rolling of device 410 on the user's head. For example, because the weight of display 454 and scoop portion 484 are positioned inward of side portion 446, which can rest on a part of the user's ear, if unsupported, such weight could cause display 454 and scoop portion 484 to move downward, resulting in rolling of device 410. By increasing the vertical surface area of band 412 on head, such rolling can be resisted.

Additionally, the fit of device 410 on a user's head can be augmented by including a high-friction material on the outer portions of band 412 that make contact with the user's head. In an example, band 412 can be enclosed in a unitary piece of material that has a surface texture of a high-friction nature. Suitable materials for this purpose can include various forms of rubber or thermoplastic elastomer ("TPE"). In another example, sections of a high friction material can be affixed by adhesive or other means to band 412 in strategic locations, such as on scoop portion 484 or on side portion 446 or temple portion 440 along the areas thereof that are configured to contact a user's head.

Figure 8A:
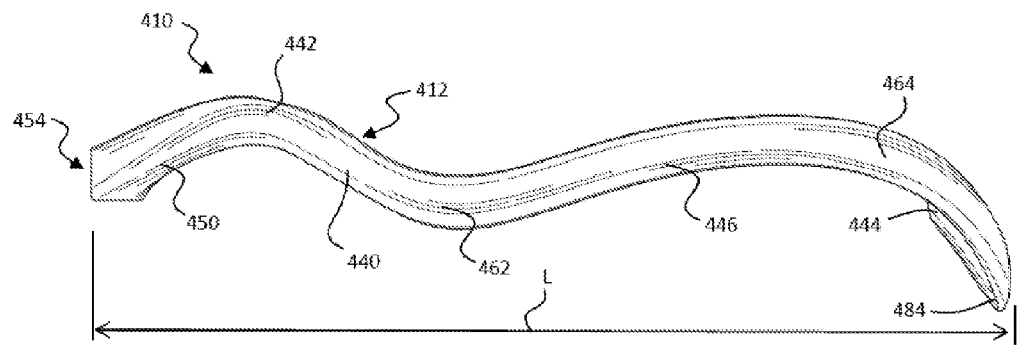
FIGS. 8A-8C show the device of FIG. 5 in various adjustment configurations thereof.
Figure 8B:
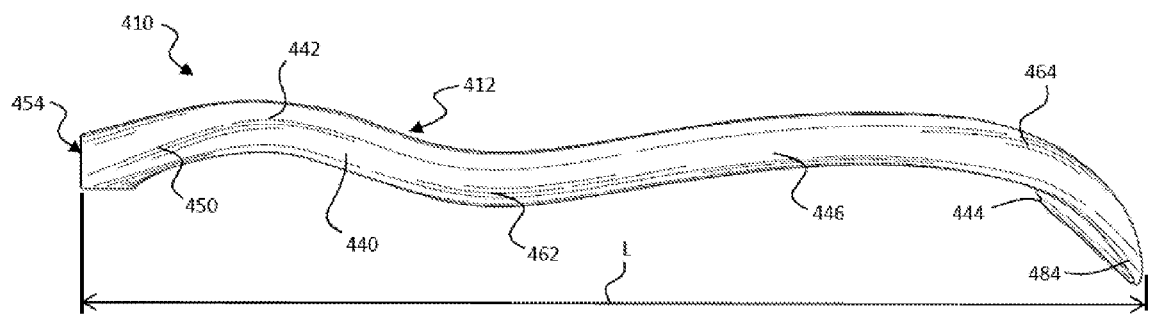
Figure 8C:
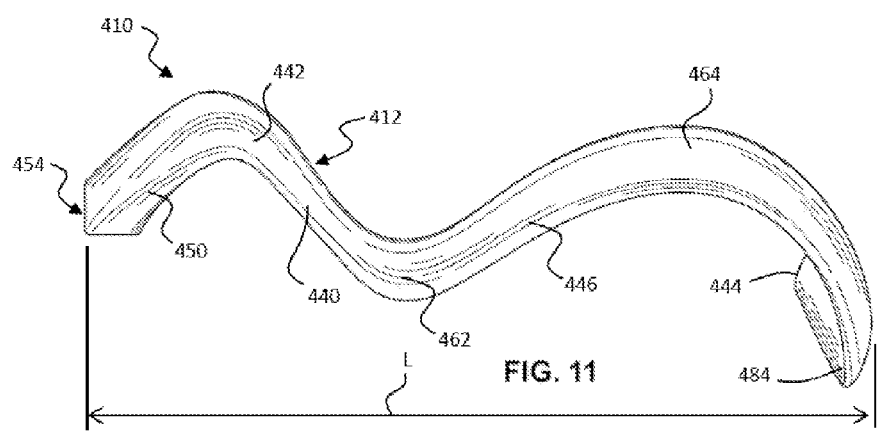

Band 412 can be configured to be adjustable such that it is capable of being worn by users with heads of varying sizes or with somewhat differently-positioned features (such as the ears or the eyes). As shown in FIGS. 8A, 8B, and 8C, band 412 can be configured such that it can be extended (FIG. 8B) and contracted (FIG. 8C) within the general shape described above. For example, contraction of band 412 can be achieved by increasing the degree of the bends that are spaced apart along band 412, including first bend 442, second bend 462, and third bend 464 such that the front-to-back length L of the device 410 can be decreased, as shown in FIG. 8C. Similarly, extension of band 412, as shown in FIG. 8B, can be achieved by decreasing the degree of bends 442, 462, and 464. In some examples, some of the portions of band 412 between or outside of bends 442, 462, and 464 can also be flexible and can also be similarly bent or straightened to extend or contract the length L of device 410.

Further adjustment can be made by additional deformations of band 412. For example, the inward curvature of side portion 446, third bend 464, or scoop portion 484 can be adjusted to generally match the curvature of the side and back of the user's head. Additionally, first and second bends 442, and 462 can be bent inward or outward to properly align display 454 laterally with the user's eye or in a vertical direction to position display 454 in a horizontal-vertical direction, as desired, with respect to the user's eye.

Adjustment of the position of display 454 can be useful in helping a user view an image projected into display 454 by device 410. As shown in FIG. 11, an exemplary adjustment can be used to position display 454 such that an image presented thereon can be comfortably viewed by a wearer of device 410. As shown, rotation of elbow portion 450 outwardly at first bend 442 can cause surface 460 to move closer to or farther from the user's eye 490. This can allow the user to adjust the display 454 for comfortable viewing of an image presented thereon and can allow the user to position display 454 at a distance such that display 454 does not contact the user's brow or eyelashes, for example. Further, in some forms of display 454 and in certain applications, it may be desired to allow the user to adjust the lateral position of display 454 such that the inside edge 461 of surface 460 is positioned outside of the user's pupil 491 when the user's eye is in a neutral (or forward-looking) position.

As shown in FIG. 11, when device 410 is being worn, display 454' may be positioned such that it at least partially extends beyond an outside edge (indicated by line 494) of the wearer's pupil 491. Outward bending of band 412 at first bend 442 can allow the user to rotate elbow portion 450 such that display 454, while moving outward away from eye 490, also moves along a lateral directional component by a distance 498 such that edge 461 moves to a position outside of the user's pupil when the user's eye 490 is in the neutral position shown in FIG. 8.

In another example, vertical movement of elbow portion 450 and temple portion 440 by increasing or decreasing the degree of second bend 462 can implement an additional or alternative form of adjustment for the position of display 454 relative to the user's eye. As shown in FIG. 9B, elbow portion 450 and temple portion 440 can together be rotated upward relative to side portion 446, compared to the position shown in FIG. 9A. Further, as shown in FIG. 9C, elbow portion 450 and temple portion 440 can together be rotated downward relative to side portion 446. A similar mode of adjustment can also be achieved by movement of first bend 442.

Figure 10A:
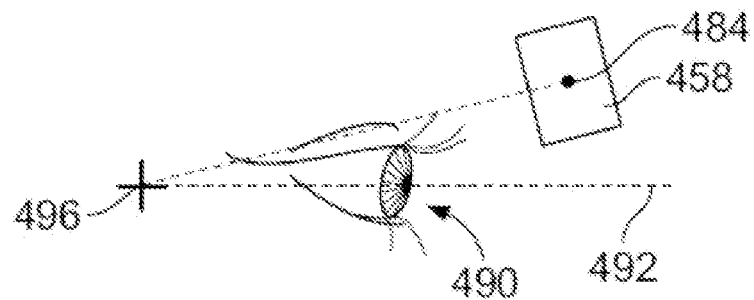
FIGS. 10A and 10B are schematic illustrations showing positioning of a display element included in the device of FIG. 5 relative to the eye of a wearer.
Figure 10B:
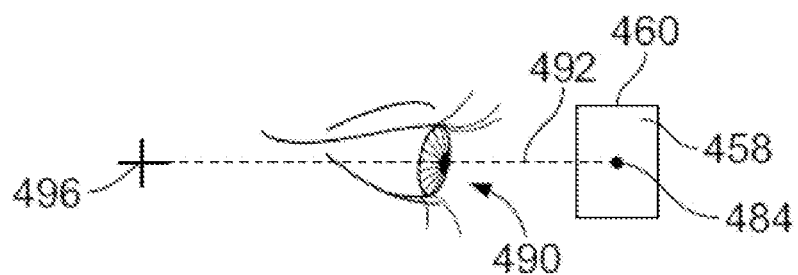

As shown in FIGS. 10A and 10B, in certain structures of display 454, such as certain display configurations (including those that incorporate specific types of prisms), it can be beneficial to orient display 454 such that viewing surface 460 is normal to a line from the image location within display 454 to the focal center 496 of the user's eye. By allowing band 412 to be reconfigured at both first bend 442 and second bend 462, the display 454 can be positioned in an optimal angle for viewing by users with different facial structures and different preferences for the horizontal or vertical position of display 454. FIG. 10A shows display 554 at a location above the horizontal center 492 of the user's eye 490. Display 454 is pivoted or otherwise rotated about axis 484 that extends in a lateral direction relative to the user's face (in and out of the page of FIG. 8A) such that surface 460 is perpendicular to a line 494 extending between surface 460 and the focal center 496 of the user's eye 490. It is noted that the diagram shown in FIG. 10A is only an example and different users can have different locations of their eye's focal center. FIG. 10B shows display 454 positioned vertically near the horizontal center 492 of the user's eye with display rotated accordingly for optimal viewing by the user, as described above.

The various modes of adjustment of band 412 described above can be facilitated by the structure of device 410. For example, band 412 can be structured to be malleable at least at strategic locations therealong. Such malleable portions can be configured to be resiliently flexible through a predetermined range of motion at a predetermined force (i.e. to undergo elastic deformation up to a certain point) and to bend or deform if moved beyond such a distance at a force above the predetermined threshold (i.e. to undergo plastic deformation above that point). That is, band 412 or portions of band 412 can be structured to have spring-like characteristics through generally small movements thereof at comparatively low forces, bending slightly but returning to a natural position. This can help band 412 exert the above-described retention forces on the user's head. Further band 412 or portions thereof can be configured such that if they are acted on with enough force and moved through at least a certain distance, such portions can be manipulated into a different natural position.

In an example, band 412 can be configured to be malleable at bends 442, 462, and 464, while being rigid along elbow portion 450, temple portion 440, and scoop portion 484. In such an example, side portion 446 can be malleable, rigid, or malleable at a higher threshold than at bends 442, 462, and 464. In other examples, temple portion 440 can be malleable, as can elbow portion 450 or scoop portion 484. An embodiment where bends 442, 462, and 464 are malleable, and elbow portion 450, temple portion 440, and scoop portion 484 are rigid can help facilitate the above-described adjustment of band 412 by extending and contracting the length L of device 410 (FIGS. 8A, 8B, and 8C). Such a structure can further facilitate adjustment of the position of display 450 as described in FIGS. 9A-9C, 10A, 10B, and 11.

Figure 12:
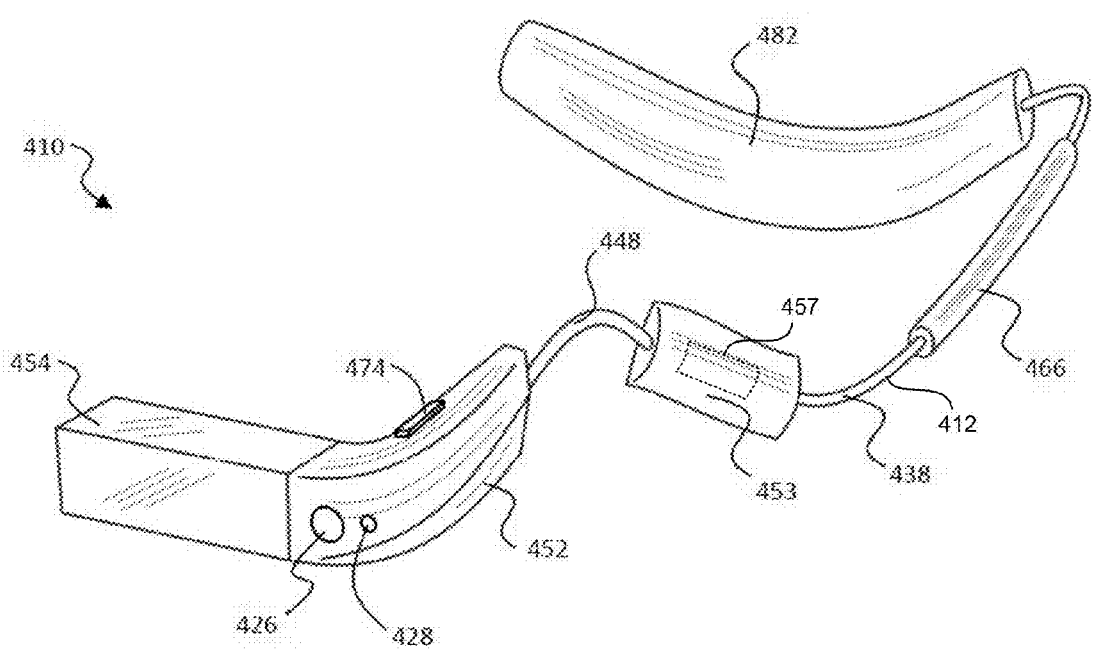
FIG. 12 shows an example internal structure of the device of FIG. 5.

Band 412 can be configured with such areas of malleability and rigidity by an example internal structure of band 412 as shown in FIG. 12. This structure can include areas of a malleable material, including an inner member 412B, such as armature wire in the desired areas of adjustability of band 412. The structure can further include areas of a rigid material that can also serve as housings and supports for components related to the function of device 410. In the example shown in FIG. 12, elbow housing 452 can be positioned within elbow portion 450 and can have display 450 affixed thereto such that elbow housing 452 can support and position display 454. Elbow housing 452 can also include electronic components and circuitry configured to generate an image that can be projected into display 450 for viewing therein by the user, as described above. Further, elbow housing 452 can also include camera 426, button 474, and circuitry related thereto.

A first malleable section 448 can extend from elbow housing 452 in the form of a section of armature wire or the like. First malleable section 448 can, thus, be positioned in a desired area for first bend 442. First malleable section 440 can be attached opposite elbow housing 452 to temple housing 453 that can extend approximately the desired length of temple portion 440. The attachment of first malleable section 448 between elbow housing 452 and temple housing 453 can permit the reconfigurable bending of band 412 at the location of first bend 442, discussed above. Temple housing 453 can include other components or circuitry associated with device 412, including circuitry 457 for touch-based input 470, as discussed above, control circuitry associated with display 454, or communications circuitry.

Similarly, a second malleable section 438 can extend from temple housing 453 opposite first malleable section 448. Second malleable section 438 can be of a similar structure to first malleable section 438 and can attach at another end thereof to a rear housing 482 that is disposed within scoop portion 484 and can provide a general shape thereof. Rear housing 482 can be configured to enclose the various components and structures discussed above as being positioned within scoop portion 484 such as batteries or the like. Rear housing 482 can also enclose a processor or other control circuitry associated with device 410 or various communications devices and/or related circuitry.

With reference still to FIG. 12, second malleable section 438 can be configured to extend through the desired positions of second bend 426, side portion 446 and third bend 464 (see FIG. 5) such that side portion 446 can also be adjustable, as discussed above. In an example, it may be desired to require a higher threshold force for deformation of side portion 446 compared to second bend 462 or third bend 464. In such an example, a stiffening member 466 can be included that surrounds second malleable section 438 in the desired area of side portion 446. Stiffening member 466 can itself be of a malleable material or can be of a resiliently deformable material such as plastic or rubber. In other embodiments, a rigid member of a construction similar to elbow housing 452 or temple housing 453 can be positioned between malleable portions in the areas or second bend 462 and third bend 466, if side portion 446 is desired to be non-deformable. Sections of wire (not shown) can also extend within or adjacent to malleable sections 448 and 438 to provide for electrical connection and/or communication between, for example, rear housing 482, temple housing 453, and elbow housing 452.

In a further example, rear housing 482 can be split into two horizontally-disposed housing segments connected by a malleable section similar to first malleable section 448 to provide internal adjustability to the shape of scoop portion 484. In such an arrangement, different components can be retained within the separate housing units. For example, one such housing can include at least one battery, and the other can contain a printed circuit board or the like.

Other structures can be used for first malleable section 448, second malleable section 438, or any other such sections included in band 412. In an example, a section of a gooseneck structure can be used or other friction-based structures including joints that require a predetermined force to move. Such joints can be attached to flexible sections of material to provide the above-described elastic deformation of band 412.

In a variation of the example shown in FIG. 12, at least first malleable portion 448 and second malleable portion 438 can be a part of a larger, unitary section of a malleable structure, such as armature wire or the like. In such a variation, temple housing 452 can be affixed on such a length of armature wire. In another variation, such a length of armature wire or the like can extend through temple housing 452.

Figure 13:
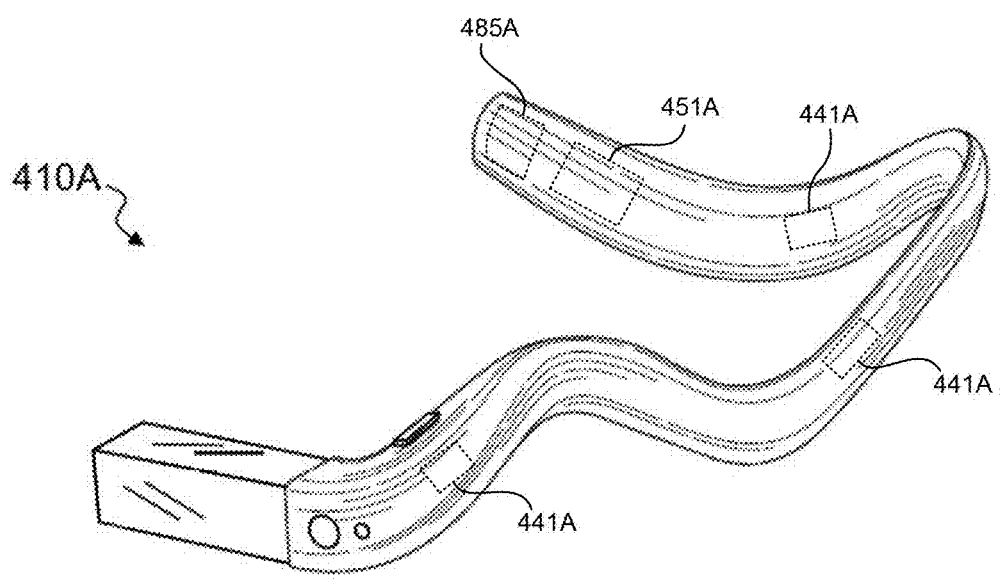
FIG. 13 shows a wearable computer device according to another embodiment of the present disclosure.
Figure 14:
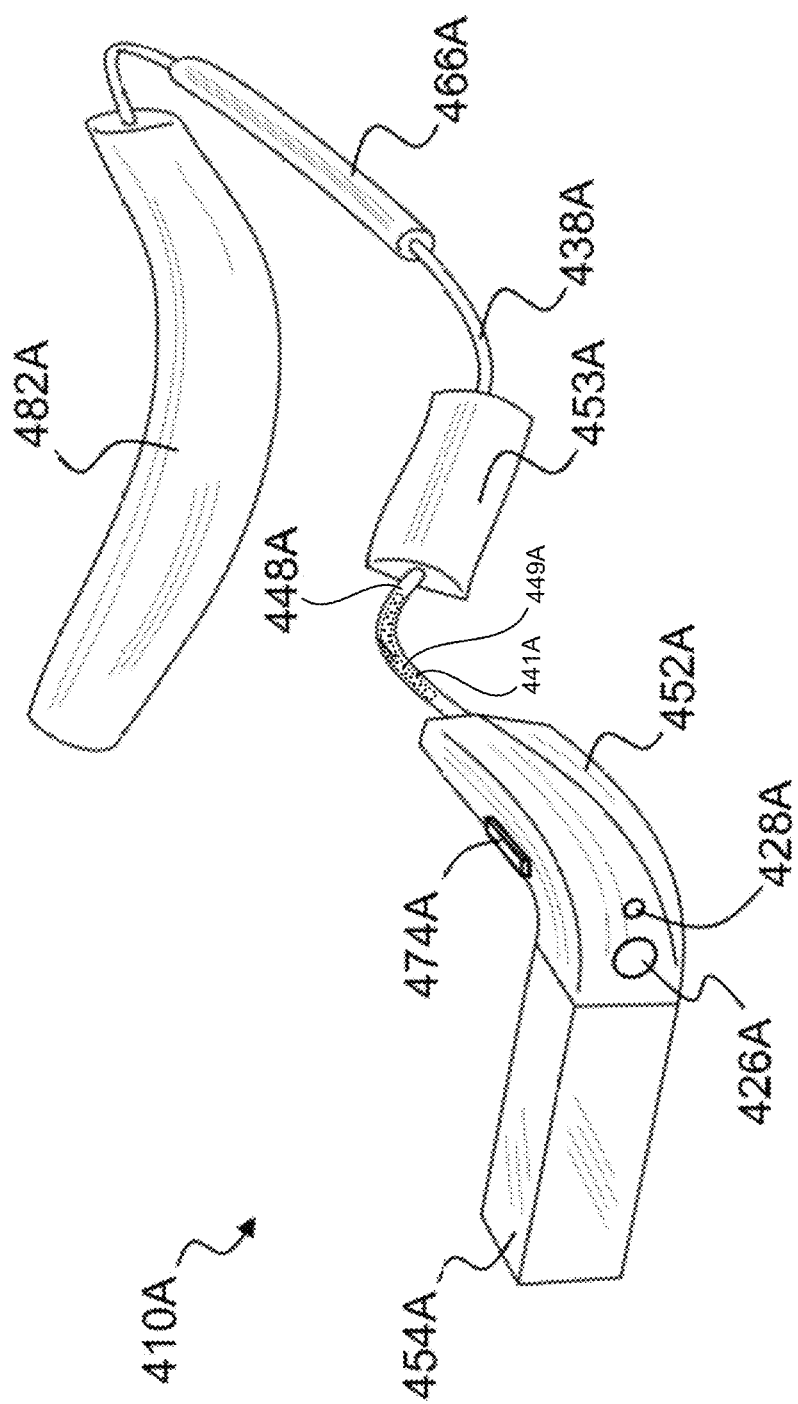
FIG. 14 shows an example internal structure of FIG. 13.

In another example shown in FIGS. 13-14, another example wearable computer device is shown. This embodiment is otherwise identical to the embodiment of FIGS. 5 and 12, except that the interior structure shown in FIG. 14 and band 412A shown in FIG. 13 are configured to accommodate magnetorheological fluid ("MR fluid") 449A and electromagnets 414A. As shown, first malleable section 448A or second malleable section 438A can include a structure 441A containing a magnetorheological fluid ("MR fluid") 449A. In general MR fluid 449A can be configured to be in a liquid state under normal conditions and to become solid when in the presence of a magnetic field. When used within a structure of a malleable section, MR Fluid can allow for the selected configuration of band 412A to be effectively secured in place using a magnetic field. MR fluid 449A can be incorporated into the malleable sections 448A or 438A by configuring them as tubular structures filled with MR fluid 449A. Such tubular sections can be in the form of flexible plastic or rubber or tubing of highly ductile metal such as copper. If flexible plastic is used, it may be desired to position additional sections of, for example, armature wire adjacent the MR fluid filled structures to provide for some retention of shape during adjustment and before application of a magnetic field.

In an example, the magnetic field associated with solidifying the MR fluid can be provided by electromagnets positioned within band 412A. The electricity for powering such electromagnets 414A can be provided with the batteries 485A used to power other aspects of device 410A and the flow of current through such electromagnets can be controlled by circuitry 451A within device 410A. In one example, device 410A can provide current for the electromagnets 414A when device 410A is turned on. In another example, device 410A can be configured to allow a user to turn on or off the current to the electromagnets, such as via a switch, button or the like, independent of other device functionality to cause device 410A to retain the shape provided by the MR fluid enabled malleable portions 438A and 448A independent of other device functions.

In another example, MR fluid can be incorporated into band 412A in a separate structure from malleable portions 438A and 448A. This can be done by including a membrane or other structure filled with MR fluid adjacent to the other elements within band 412A. Such a structure can be attached to, for example, temple housing 453A, elbow housing 452A, or rear housing 482A.

With reference back to FIG. 12, the internal components shown in FIG. 12 can be covered by or enclosed within an outer member 412A, such as jacket 476 that can give the unitary external appearance of band 412 shown in FIGS. 5 and 6. Jacket 476 can be of a resiliently flexible material such as TPE or various rubbers, which can also be configured to provide the desired high-friction characteristics for band 412 described above. Jacket 476 can be assembled over the internal components of band 412 by sliding jacket 476 over such components or by molding thereof over the components. Further, jacket 476 can be configured such that display 454 extends from an opening therein. Jacket 476 can also include openings associated with camera 426, button 474, or other features of device 410 to which access is desired (such as ports for connection with external devices or power supplies).

Figure 9A:
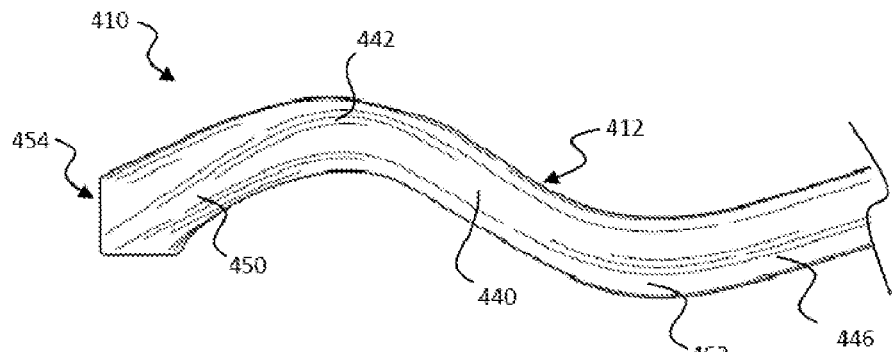
FIG. 9A-C show the device of FIG. 5 in various additional adjustment configurations thereof.
Figure 9B:
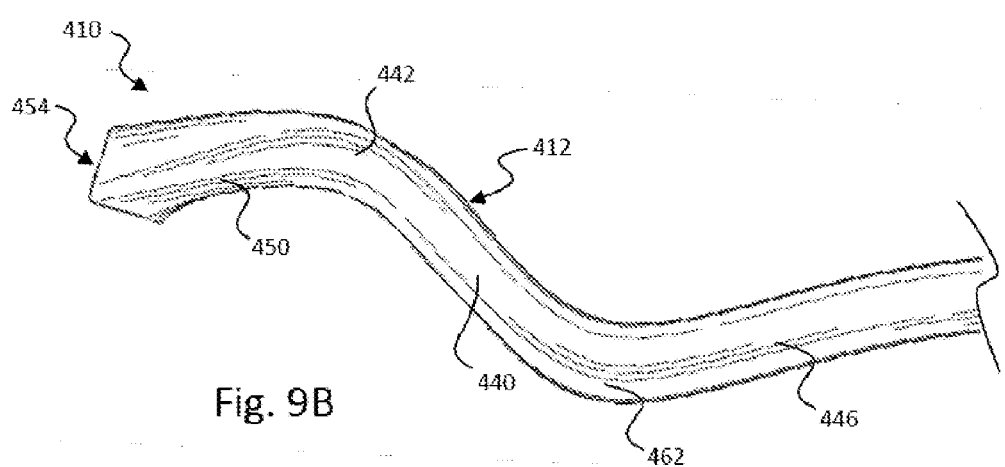
Figure 9C:
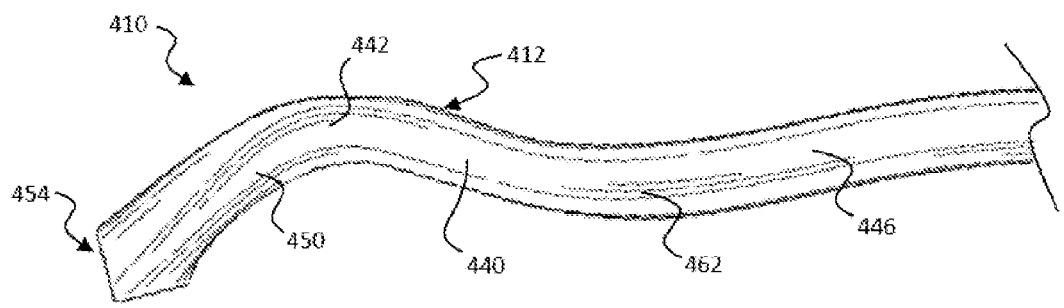

Jacket 476 can also be configured to follow a selected predetermined general shape of band 412, such as that shown in FIGS. 5, 8A, and 9A. Such a shape can be given to jacket 476 by molding or the like, and jacket 476 can be resiliently deformable to allow the above-described deformation of band 412 through a desired range. Jacket 476 can be configured to permit a range of motion desired for band 412 and to partially limit such motion by adjusting the flexibility thereof.

In another example, jacket 476 can be configured with one or more internal compartments. Such compartments can be configured to retain components associated with display 454, touch based input 470 or to retain batteries, circuit boards or the like. Such a jacket 476 can be flexible, such as described above, and such compartments can be reinforced with a rigid material to provide protection for the components therein. Further a malleable member, such as a length of armature wire, or a structure containing MR fluid can be carried within jacket 476 separate from the component compartments therein.

As discussed above, an input device in the form of a touch-based input 470 (FIG. 5) is also desirably included in band 412. Touch-based input 470 can be a touchpad or trackpad-type device configured to sense at least one of a position and a movement of a finger via capacitive sensing, resistance sensing, or a surface acoustic wave process, among other possibilities. Touch-based input 470 can further be capable of sensing finger movement in a direction parallel or planar to a surface thereof, in a direction normal to the surface, or both, and may also be capable of sensing a level of pressure applied thereto. Touch-based input 470 can be formed having an outer layer of one or more insulating, or dielectric, layers that can be opaque, translucent, or transparent and an inner layer of one or more conducting layers that can be opaque, transparent, or translucent.

In an embodiment, the outer layer of the touch-based input 470 can be a portion of jacket 476. This can provide a seamless or uniform incorporation of touch-based input 470 into housing band 412. As discussed above, temple housing 453 (or alternatively, a compartment within jacket 476) can define an interior cavity for containing an inner layer of the touch-based input 470 and any electrical structures, such as control circuitry, associated therewith. The outer layer of the touch-based input 470 can include a selected operable area 472 in the form of one or more touch-surfaces 470 thereof, as dictated by the size, shape, and position of the inner layer of the touch-based input 470. As described above, jacket 476 can be formed from TPE, rubber, or the like, which are dielectric materials. The use of such materials facilitates the use of jacket 476 as the outer layer of the touch-based input 470. In an alternative embodiment, the touch-based input can be a discrete element that is mounted in an opening in jacket 476 that includes its own dielectric outer layer, separate from wall 453 to define the operable area within a window or opening through wall 453 in a manner similar to a touchpad on a laptop computer. In embodiments where an internal temple housing 453 is not used, the circuitry for touch based input 470 can be flexible to allow band 412 to bend in the area thereof.

In the embodiment shown, touch-based input 470 is positioned on band 412 and defines a vertical plane that overlies a portion of the side of the user's head. Accordingly, touch-based input 470 may not be visible to a user of device 410, when it is being worn. To help the user identify any operable areas 472 of touch based input 470 the band 412 can be formed to have a texture provided by a raised, indented, or roughened surface so as to provide tactile feedback to a user when the user's finger contacts the operable area 472. Such a texture can define the boundaries of the operable area 472, can be consistent through the operable area 472, or can vary along horizontal and vertical lengths of the operable area 472 to give the user feedback as to the location of a finger contacting operable area 472.

It is also noted that, although the embodiment of FIG. 5 shows a configuration of device 410 such that display 454 is positioned over the left eye of the user when being worn, and in which band 412 extends over the user's ear along the adjacent left side of the user's head, other similar embodiments are possible in which a mirror-image of device 410 can be worn on the right side of the user's head. Depending on the application of device 410 or individual user preferences, it may be desirable for device 410 to be configured to position display 454 on a particular side of the user's head. For example, a right-handed person may prefer having the display 454 on the right side of her head to make interaction with touch-based input 470 easier. In another example, a person may prefer to have the display 454 over a dominant eye for easier interaction with elements presented on display 454 or over a non-dominant eye to make it easier to shift his focus away from elements presented on display 454 when engaged in other activities.

In a commercial setting, a number of different devices similar to device 410 can be made available having respective bands 412 that are configured to fit different ranges of head sizes, such as "small", "medium", and "large". Similarly, variations for left-eye display 454 position and right-eye display 454 positions within the various sizes can also be made available. Further variations of devices can be made available with bands offering different fit styles (such in varying shapes) or colors.

As a further alternative, a single display 454 could be used with a prism or other structure configured to extend over both eyes of the user for displaying an image viewable by both eyes.

Additional components can be included in the various device assemblies described herein. These components can include additional inputs, control circuitry boards, antennae or the like. The various locations in which these additional components are located on or in such a device can also be selected to allow for a predetermined weight distribution.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An electronic device, comprising:
a display;
a band configured to be worn on a head of a user and over only one ear of the user, the band defining a display end to which the display is affixed, the band extending from the display end to a free end, the band including an inner member and an outer member, the outer member having a general shape that defines a temple portion adjacent the display end, a scoop portion adjacent the free end, and an ear portion between the temple portion and the scoop portion, wherein the general shape is deformable and changes from a first shape to a second shape that corresponds to a shape of the head of the user, the band being configured to secure the display to the head of the user such that the user can configure the band in an adjusted shape such that the scoop portion contacts a rear portion of the head of the user and conforms to at least a portion of the rear portion of the head, the ear portion contacts a portion of an ear of the user, and the temple portion contacts a portion of a temple of the user adjacent the ear, and such that the display element is suspended over an eye of the user adjacent the temple, the inner member permitting deformation of the outer member and facilitating retention of the outer member in the adjusted shape; and
image generating means configured for generating an image presentable to the user on the display, the image generating means disposed within the band,
wherein the inner member includes a volume of magnetorheological fluid that is configured such that the inner member retains the outer member in the adjusted shape in the presence of a magnetic field above a retention threshold and permits adjustment to the general shape of the outer member in the presence of a magnetic field below the retention threshold.

2. The device of claim 1, wherein the outer member includes an outside surface, and wherein the band further includes touch-based input circuitry disposed therein such that a portion of the outside surface acts as a touch-based input configured for receiving, from the user, an input associated with a function, the function being related to information that is presentable on the display.

3. The device of claim 1, wherein the outer member comprises a molded thermoplastic elastomer.

4. The device of claim 1, wherein at least a portion of the inner member includes armature wire.

5. The device of claim 1, wherein at least a portion of the inner member is elastically deformable below a first yield point of a first material comprising the at least the portion of the inner member and plastically deformable above the first yield point, and wherein the outer member is elastically deformable below a second yield point of a second material comprising the outer member, the second yield point being greater than the first yield point.

6. The device of claim 5, wherein the first yield point allows the inner member to elastically deform when being worn by the user in the adjusted configuration.

7. The device of claim 5, wherein the first yield point allows the inner member to be elastically deformed during removal of the device from the head of the user.

8. The device of claim 1, wherein the inner member includes a plurality of rigid sections on opposing ends of at least one malleable section such that the inner member permits adjustment to the general shape of the outer member in at least one adjustment area adjacent the malleable section, while limiting such adjustment in areas adjacent the rigid sections.

9. The device of claim 8, further including one or more electronic components, and wherein at least one of the rigid sections includes a housing in which at least one of the one or more electronic components is retained.

10. The device of claim 8, wherein the inner member includes a stiffening member disposed on the at least one malleable section.

* * * * *